United States Patent
Ozaki et al.

(10) Patent No.: US 6,342,915 B1
(45) Date of Patent: Jan. 29, 2002

(54) IMAGE TELECOMMUNICATION SYSTEM

(75) Inventors: Nobuyuki Ozaki, Hoya; Susumu Tachi, 2-31-14, Umezono, Tsukuba-shi, Ibaraki-ken, both of (JP)

(73) Assignees: Kabushiki Kaisha Toshiba, Kawasaki; Susumu Tachi, Tsukuba, both of (JP)

( * ) Notice: Subject to any disclaimer, the term of this patent is extended or adjusted under 35 U.S.C. 154(b) by 0 days.

(21) Appl. No.: 09/038,629

(22) Filed: Mar. 12, 1998

(30) Foreign Application Priority Data

Mar. 13, 1997 (JP) ............................................. 9-059248

(51) Int. Cl.$^7$ .......................... H04N 7/18; G18B 26/00
(52) U.S. Cl. ........................ 348/61; 348/143; 340/505; 340/506; 379/35
(58) Field of Search ................................. 348/141, 143, 348/144, 148, 150, 151, 152, 153, 160, 161, 169, 170, 61–67; 379/110.01, 21, 35, 93.01, 93.05, 93.08, 93.17, 93.23; 340/505, 506, 531, 286.61; G08B 26/00

(56) References Cited

U.S. PATENT DOCUMENTS

| | | | | |
|---|---|---|---|---|
| 5,243,421 A | * | 9/1993 | Nagata et al. | 348/423 |
| 5,509,009 A | * | 4/1996 | Laycock et al. | 370/62 |
| 5,544,649 A | * | 8/1996 | David et al. | 128/630 |
| 5,583,795 A | * | 12/1996 | Smyth | 364/516.444 |
| 5,619,183 A | * | 4/1997 | Ziegra et al. | 340/505 |
| 5,771,436 A | * | 6/1998 | Ikehama | 455/12.1 |
| 5,793,419 A | * | 8/1998 | Fraley | 348/143 |
| 5,844,601 A | * | 12/1998 | McPleely | 348/143 |
| 5,864,481 A | * | 1/1999 | Gross et al. | 364/400 |
| 5,933,479 A | * | 8/1999 | Michael et al. | 379/110.01 |
| 6,023,288 A | * | 2/2000 | Commbs et al. | 348/64 |
| 6,028,625 A | * | 2/2000 | Cannon | 348/135 |
| 6,097,429 A | * | 8/2000 | Seeley et al. | 348/154 |

FOREIGN PATENT DOCUMENTS

| | | |
|---|---|---|
| GB | 2 251 780 | 7/1992 |
| JP | 5-204013 | 8/1993 |
| WO | WO 97/04597 | 2/1997 |

* cited by examiner

*Primary Examiner*—Chris Kelley
*Assistant Examiner*—Tung Vo
(74) *Attorney, Agent, or Firm*—Finnegan, Henderson, Farabow, Garrett & Dunner, L.L.P.

(57) ABSTRACT

An image telecommunication system comprises a worker's device and a manager's device. The worker's device collects an image of an object and transmits it to the manager's device placed in a remote place, so that the image is displayed on a display screen of the manager's device. The manager's device transmits a designated position of the image, designated in a state where the image is displayed, to the worker's device. The worker's device indicates a position of the object corresponding to the designated position received from the manager's device. The worker's device detects a point of view of the worker. The manager's device suppresses fluctuation of the image displayed on the display screen, when it is determined that the worker looks at the object substantially continuously.

12 Claims, 8 Drawing Sheets

IMAGE TELECOMMUNICATION SYSTEM

BACKGROUND OF THE INVENTION

The present invention relates to an image telecommunication system for facilitating mutual understanding between a worker who actually works at a workplace and a manager who manages the worker from a remote place.

Guard and maintenance of security, patrolling around a factory, etc. are generally carried out by a single person. In normal cases, the routine work itself, such as maintenance and patrol, can be performed by a worker who is not familiar with the workplace. However, in preparation for some unusual situations, a manager stands by in a managing room, who has a full knowledge the workplace environment and the handling and performance of the apparatuses in the workplace.

When the worker finds anything unusual in the workplace, if necessary, he/she can tell the manager in the managing room about the abnormality through wired communications such as a telephone or radio communications such as a cellular phone. The worker asks the manager for voice instructions also through the wired or radio communications. The worker, for example, carries out an operation to cope with the unusual matter in accordance with the manager's instructions.

However, when information is exchanged between the worker and the manager only by voice through the telephone or the like, the following problems may arise.

First, when a single worker who does not know the jobs very well patrols the workplace, there is a high possibility that he or she may overlook an unusual matter.

Second, even if the worker finds an unusual matter, the manager stationed in the managing room may not understand details of the matter accurately, since the worker tells the situations only by word. In this case, the manager cannot give the worker instructions for the optimal measures to cope with the unusual matter.

Therefore, the manager goes to the workplace where the unusual matter occurs. However, since it takes a certain time for the manager to arrive at the workplace, this measure is inadequate in case of emergency.

Monitor cameras can be set in suitable points in the workplace, so that the manager in the managing room can monitor the images photographed by the monitor cameras. However, in general, the monitor cameras are meant to take an image of a wide field in the work place to monitor whether an unusual matter occurs. Therefore, detailed images of the abnormality cannot be observed in the managing room. In addition, since the monitor camera can take pictures only in a predetermined direction, it is impossible to observe the abnormality from different directions.

BRIEF SUMMARY OF THE INVENTION

The present invention has been made to overcome the above situations. Accordingly, a first object of the present invention is to provide an image telecommunication system by which a manager in a remote place can visually understand the situations in the workplace accurately without fail, even if the worker who patrols the workplace is not familiar with the equipment therein.

A second object of the present invention is to provide an image telecommunication system which can supply a stable image to a manager in a remote place and by which the manager can visually understand the situations in the workplace accurately without fail, even if the worker who patrols the workplace is not familiar with the equipment therein.

A third object of the present invention is to provide an image telecommunication system which can transmit not only voice instructions but also visual instructions for the actual workplace from a manager to a worker, and by which the manager can visually understand the situations in the workplace accurately without fail and give appropriate instructions to the worker, even if the worker who patrols the workplace is not familiar with the equipment therein.

To achieve the first object, an image telecommunication system of the present invention comprises: a worker's device, put on a worker, for collecting an image of an object present in a field of view of the worker and transmitting it outside the worker's device; and a manager's device, placed in a remote place distant from the worker's device, for receiving and displaying the image of the object transmitted from the worker's device on a display screen, wherein: the worker's device includes detecting means for detecting a point of view of the worker; and the manager's device includes displaying means for displaying the detected point of view on the display screen, when it is determined that the worker looks at the object substantially continuously.

In the image telecommunication system having the above structure, the worker's device is put on the worker who executes various jobs including patrol in the workplace. An image of an object present in a field of view of the worker is collected by the worker's device, transmitted to the remote manager's device, and displayed on the display screen.

In this case, since the point of view is displayed on the display screen when the worker continuously looks at the object, the manager can accurately recognize the position of the object in which the worker is interested.

To achieve the second object, an image telecommunication system of the present invention comprises: a worker's device, put on a worker, for collecting an image of an object present in a field of view of the worker and transmitting it outside the worker's device; and a manager's device, placed in a remote place distant from the worker's device, for receiving and displaying the image of the object transmitted from the worker's device on a display screen, wherein: the worker's device includes detecting means for detecting a point of view of the worker; and the manager's device includes fluctuation suppressing means for suppressing fluctuation of the image displayed on the display screen, when it is determined that the worker looks at the object substantially continuously.

Since the worker's device is put on the worker, when the worker moves or swings, the image of the object collected by the worker's device and displayed on the display screen of the manager's device also moves or swings. As a result, the manager must look at the moving image, which is very difficult to observe. Therefore, it is necessary to suppress the movement (fluctuation) of the image of the object displayed on the display screen.

In general, even when the field of view is changed by moving the head on which the worker's device is put, the worker continues looking at the same portion of the object in a central portion of the field of view in which he/she is interested. According to the present invention, when it is determined that the worker looks at the object substantially continuously, the fluctuation of the image is suppressed.

Thus, the manager can observe the image of the object displayed on the display screen in the same manner as the worker.

To achieve the third object, an image telecommunication system of the present invention comprises: a worker's device, put on a worker, for collecting an image of an object present in a field of view of the worker and transmitting it outside the worker's device; and a manager's device, placed in a remote place distant from the worker's device, for receiving and displaying the image of the object transmitted from the worker's device on a display screen, wherein: the manager's device includes transmitting means for transmitting a designated position, designated in a state where the image is displayed on the display screen, to the worker's device; and the worker's device includes indicating means for indicating a position on the object corresponding to the designated position received from the manager's device.

In the image telecommunication system having the above structure, the worker puts on the worker's device. An image of an object present in a field of view of the worker is collected by the worker's device, transmitted to the remote manager's device in a manager's room where the manager is stationed, and displayed on the display screen. When the manager designates a point of the object displayed on the display screen of the manager's device, the corresponding position of the object in the workplace is indicated via the worker's device put on the worker.

Thus, the image in the workplace can be transmitted to the manager in the remote place with reality, while instructions can be transmitted from the manager to the worker accurately.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described with reference to the accompanying drawings.

Figure 1:
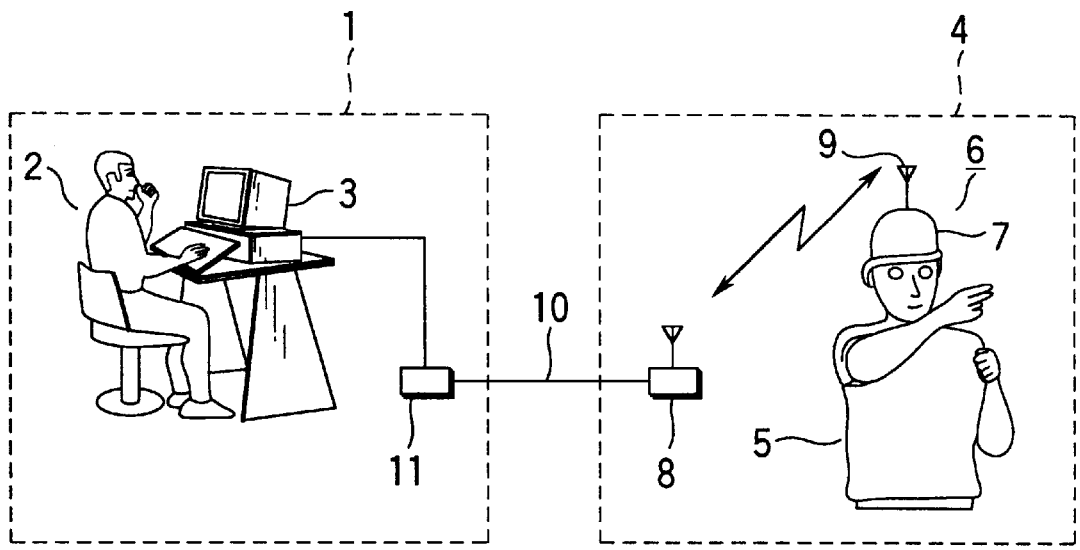
FIG. 1 is a schematic diagram showing an image telecommunication system according to an embodiment of the present invention.

FIG. 1 is a schematic diagram showing an image telecommunication system according to an embodiment of the present invention, to which an image telecommunication method of the present invention is applied. For example, a managing room 1 in a large-scale plant is equipped with a manager's device 3 comprising a computer operated by a manager 2. A worker 5 who patrols workplaces 4 puts on a helmet 7 on which a worker's device 6 comprising a computer is mounted.

A radio terminal 8 for transmitting and receiving radio waves to and from an antenna 9 of the worker's device 6 is set in each workplace 4. The radio terminal 8 of the workplace 4 is connected to the manager's device 3 through a transmission path 10 of a LAN and a transmitting/receiving terminal 11 in the managing room 1. Thus, information can be exchanged freely between the manager's device 3 and the worker's device 6 in the workplace 4 through the transmission path 10 and the radio terminal 8. The transmission path 10 can be replaced with a radio circuit.

Figure 2:
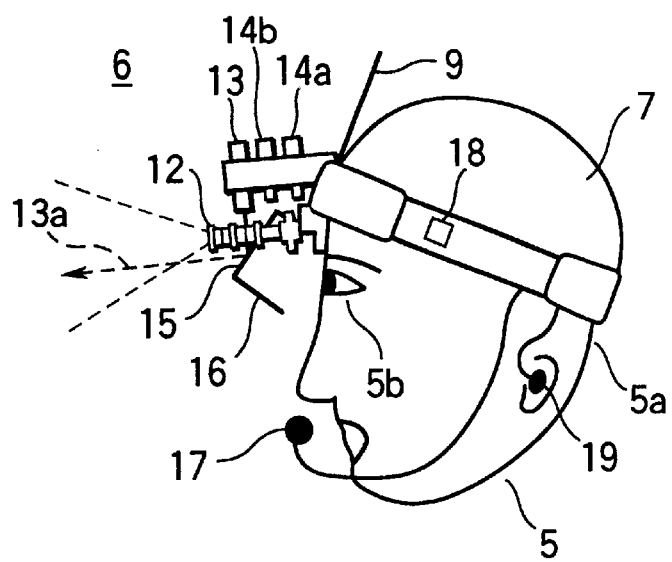
FIG. 2 is a side view of a worker's device.

FIG. 2 is a side view of the worker's device 6 attached to the helmet 7 put on the head 5a of the worker 5. A camera 12 incorporating, for example, a CCD sensor, has a field of view substantially the same as that of the eyes 5b of the worker 5, and takes an image of an object in the field of vision of the eyes 5b of the worker 5.

A laser beam 13a emitted from a position indicating device 13, serving as a laser source, is reflected forward from the worker 5 by an upper semi-transparent mirror portion 15 of eyeglasses of the worker's device 6. The reflected beam is irradiated on a designated position of the object.

Figure 3:
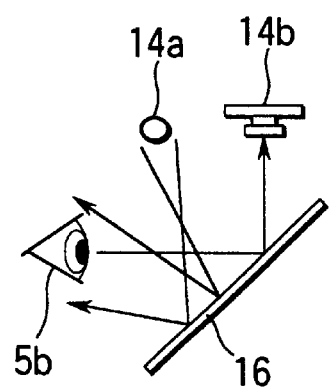
FIG. 3 is a diagram showing the operation principle of an eye tracking sensor.
Figure 4:
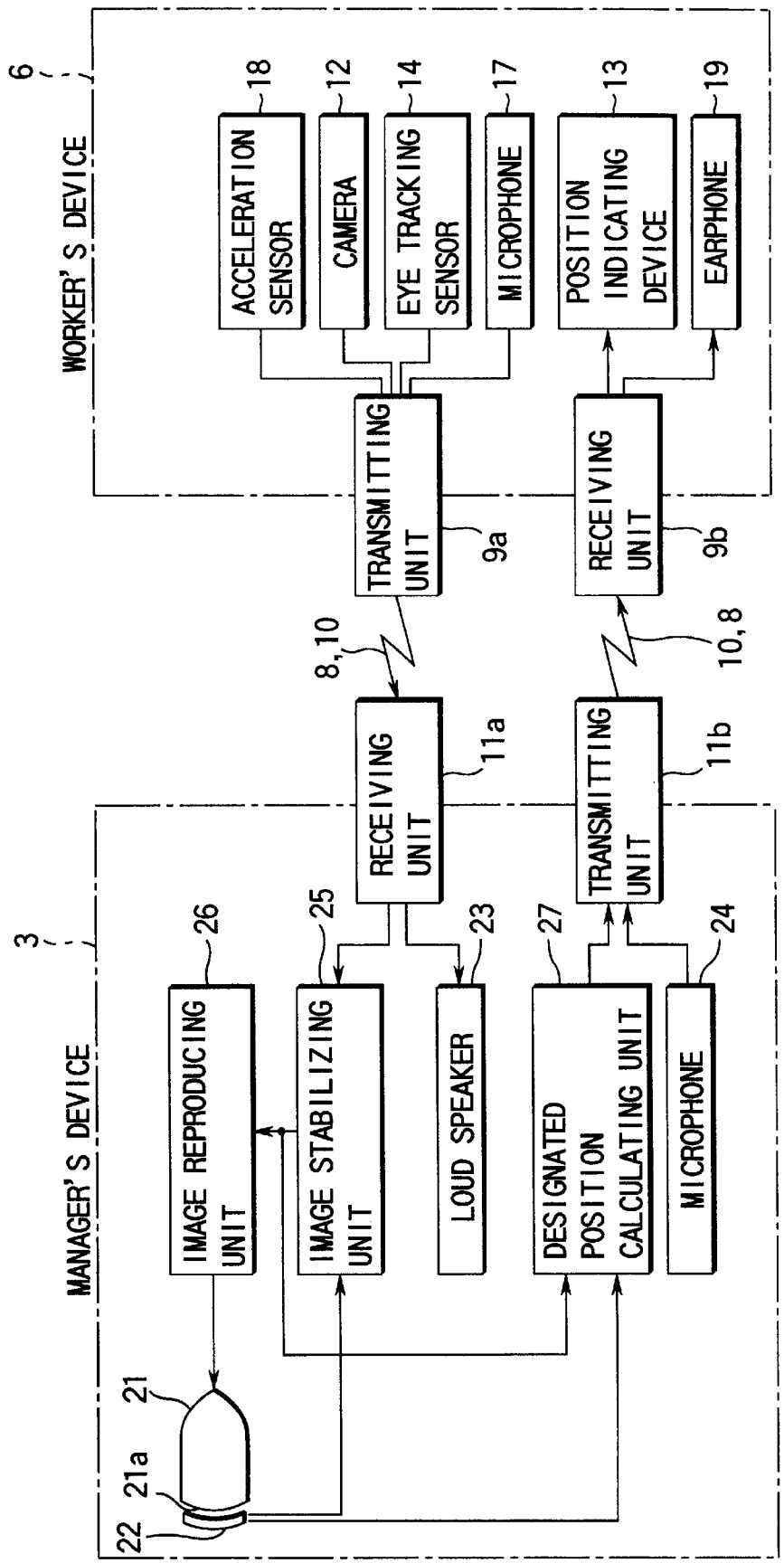
FIG. 4 is a block diagram showing a structure of the image telecommunication system of the embodiment.

As shown in FIG. 3, infrared light, output from an infrared light source 14a incorporated in an eye tracking sensor 14 shown in FIG. 4, is reflected by a lower semi-transparent mirror portion 16 of the eyeglasses of the worker's device. The reflected light is irradiated on the pupils of the eyes 5b of the worker 5. The light reflected by the pupils of the eyes of the worker 5 is reflected again by the lower semi-transparent mirror portion 16, and enters a two-dimensional image sensor 14b. Then, the eye tracking sensor 14 detects a point of view within the field of view of the worker 5 based on the position of the image of the pupils of the worker 5 formed on the image sensor 14b.

As shown in FIG. 2, a compact microphone 17 for detecting a voice of the worker 5 and a sound in the workplace 4 is attached to the helmet 7. An acceleration sensor 18, for detecting a very small amount of movement of the head 5a of the worker 5, is also attached to the helmet 7. The acceleration sensor 18 comprises three acceleration sensor units arranged in three directions perpendicular to one another, and detects accelerations $\alpha_x$, $\alpha_y$ and $\alpha_z$ in the three-dimensional directions. A movable sensor such as a gyroscope can be used in place of the acceleration sensor 18.

An earphone 19 for outputting a voice of the manager 2 is inserted in an ear of the worker 5.

FIG. 4 is a block diagram showing structures of the manager's device 3 and the worker's device 6 constituting the image telecommunication system of this embodiment.

The manager's device 3 constituted by a computer includes a CRT display device 21, a touch panel 22 attached to the front surface of a display screen 21a of the CRT display device 21, a loud speaker 23, a microphone 24, a receiving unit 11a and a transmitting unit 11b constituting the transmitting/receiving terminal 11. These devices are hardware components.

The manager's device 3 further includes an image stabilizing unit 25, an image reproducing unit 26 and a designated position calculating unit 27, which are constructed as program modules in an application program.

The worker's device 6 includes the acceleration sensor 18, the camera 12, the eye tracking sensor 14, the microphone 17, the position indicating device 13, the earphone 19, and a receiving unit 9a and a transmitting unit 9b connected to the antenna 9.

In the worker's device 6 as described above, the camera 12 mounted on the helmet 7 of the worker 5 takes images of various objects in the field of view of the worker 5, including the equipment in the workplace 4. When the worker 5 or the head 5a moves, the acceleration sensor 18 detects the accelerations $\alpha_x$, $\alpha_y$ and $\alpha_z$ of the head 5a of the worker 5 in the three-dimensional directions.

The point of view of the eyes 5b of the worker 5 is always detected by the eye tracking sensor 14. Therefore, if the worker 5 changes the direction of the eyes 5b without moving the head, the point of view detected by the eye tracking sensor 14 is changed. Further, a voice of the worker 5 and an ambient sound are collected by the microphone 17 and converted to sound signals.

The data of the image, acceleration, point of view and sound signals obtained by the worker's device 6 are transmitted to the manager's device 3 through the antenna 9, the radio terminal 8, the transmission path 10 and the receiving unit 11a. The data of the image, acceleration, point of view received by the manager's device 3 are input to the image stabilizing unit 25. The sound signal is applied to the loud speaker 23, which outputs a sound corresponding to the signal.

A structure and operation of the image stabilizing unit 25 will now be described.

Figure 5:
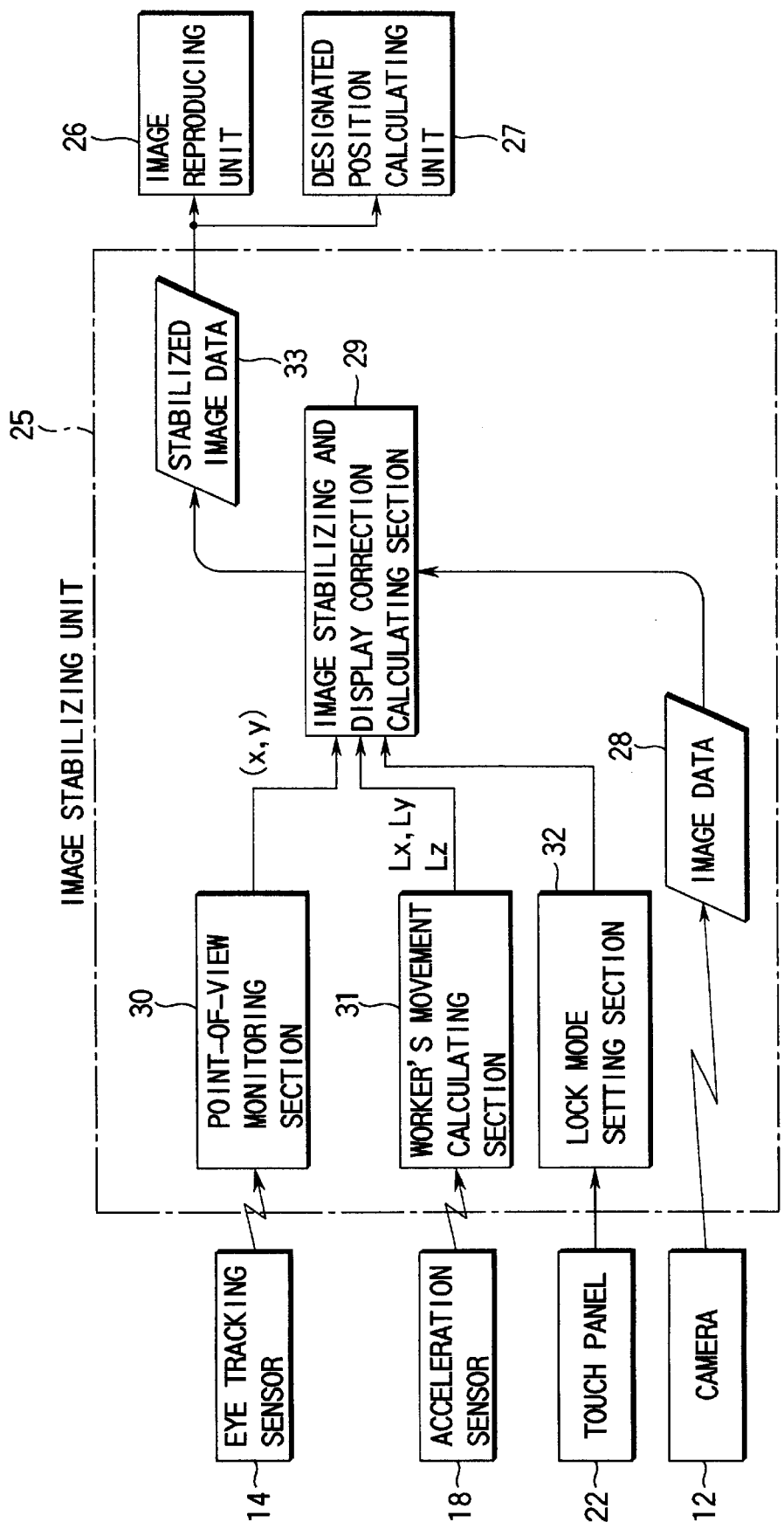
FIG. 5 is a block diagram showing a structure of an image stabilizing unit incorporated in the image telecommunication system.

FIG. 5 is a block diagram showing a structure of the image stabilizing unit 25 incorporated in the image telecommunication system. Image data 28 of an object supplied from the camera 12 incorporated in the worker's device 6 is input to an image stabilizing and display correction calculating section 29. The point of view of the worker 5 input from the eye tracking sensor 14a is input to a point-of-view monitoring section 30. The point-of-view monitoring section 30 converts the input points of view to coordinates (x, y) on the display screen 21a in the CRT display device 21 at periods of, for example, 0.1 second. The coordinates are transmitted to the image stabilizing and display correction calculating section 29 on the next stage.

The point-of-view monitoring section 30 compares first coordinates (x, y) obtained at a current period with second coordinates (x, y) obtained at the previous period. It determines whether the difference between the first and second coordinates is greater than a predetermined value, and transmits the result of the determination to the image stabilizing and display correction calculating section 29.

The accelerations $\alpha_x$, $\alpha_y$ and $\alpha_z$ in the three-dimensional directions obtained by the acceleration sensor 18 are input to a worker's movement calculating section 31. The worker's movement calculating section 31 integrates the input accelerations $\alpha_x$, $\alpha_y$ and $\alpha_z$ twice and calculates amounts of movement $L_x$, $L_y$ and $L_z$ of the camera 12, i.e., the head 5a of the worker 5, per unit time (0.1 second). The calculated amounts of movement are transmitted to the image stabilizing and display correction calculating section 29.

If a gyroscope is used in place of the acceleration sensor 18, the amounts of movement in the three-dimensional directions per unit time output from the gyroscope are directly transmitted to the image stabilizing and display correction calculating section 29.

If it is necessary for the manager 2 to stop an animation image on the display screen 21a of the CRT display device 21 in order to observe it in detail, a lock command can be transmitted from a lock mode setting section 32 to the image stabilizing and display correction calculating section 29 by depressing a stop button displayed on the touch panel 22. When a cancel button on the touch panel 22 is depressed, the lock mode setting section 32 is stopped and the lock command for the image stabilizing and display correction calculating section 29 is canceled.

The image stabilizing and display correction calculating section 29 stabilizes image data 28 obtained by the camera 12 using the amounts of movement $L_x$, $L_y$ and $L_z$ and the coordinates (x, y) of the point of view input at fixed periods of 0.1 second. The image stabilizing and display correction calculating section 29 transmits the stabilized image data 33 to the image reproducing unit 26. The image reproducing unit 26 displays the stabilized image data 33 on the display screen 21a of the CRT display device 21.

Figure 6:
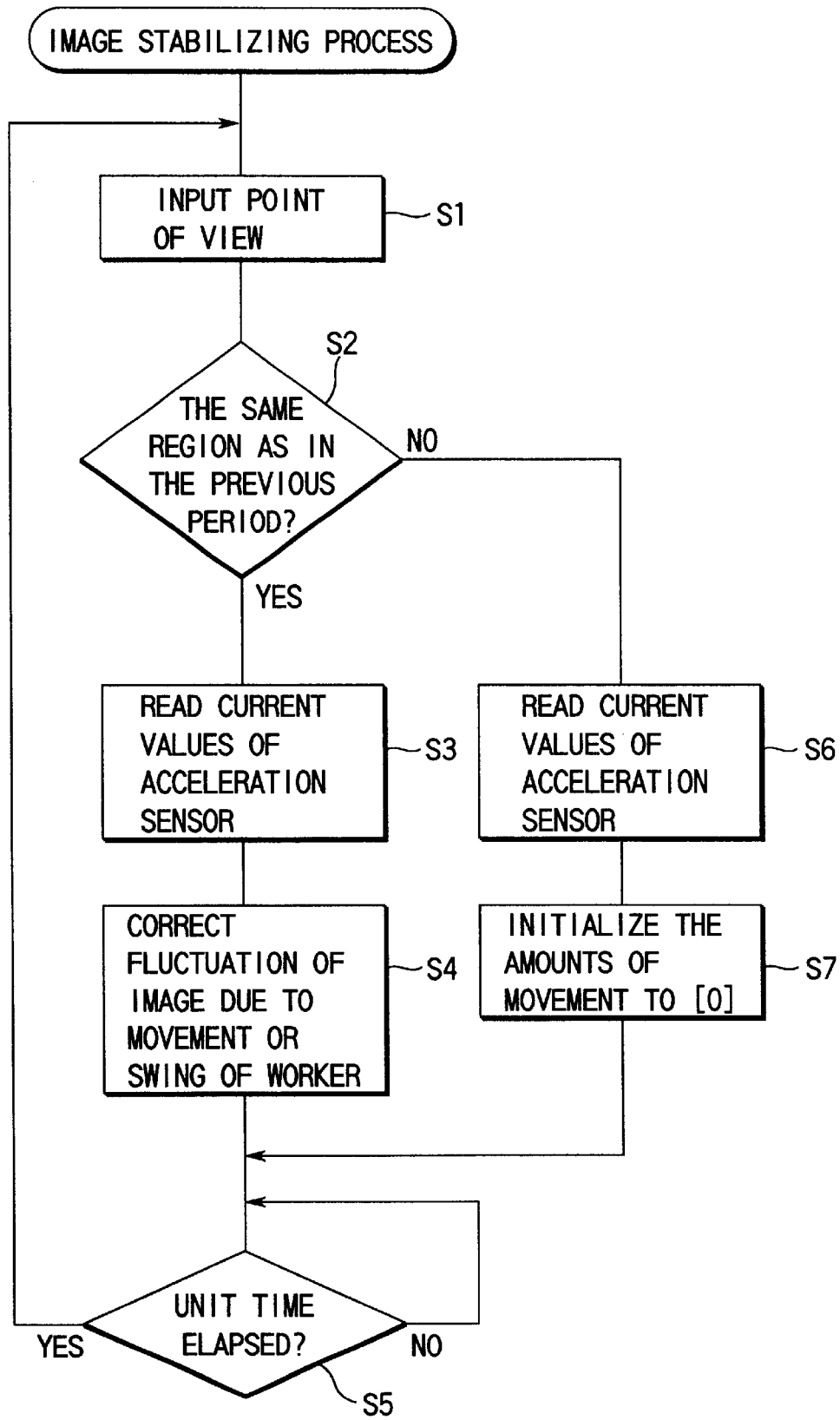
FIG. 6 is a flowchart showing an operation of the image stabilizing unit.

FIG. 6 is a flowchart showing procedures executed by the sections 30, 31 and 29 of the image stabilizing unit 25.

In step Sl, the point-of-view monitoring section 30 calculates coordinates (x, y) of the point of view on the display screen. Then, the image stabilizing and display correction calculating section 29 calculates amounts of movement ΔX and ΔY of the point of view from coordinates (x, y) obtained at a current period and coordinates (x, y) obtained at the previous period. If the amounts of movement ΔX and ΔY are within a predetermined range, it is judged that the worker 5 continues to looking at the same point of an object in the workplace (S2) (the coordinates (x, y) of the point of view regarded as unchanged on the display screen).

In this case, the flow advances to step S3, in which the worker's movement calculating section 31 reads the accelerations $\alpha_x$, $\alpha_y$ and $\alpha_z$ in the three directions from the acceleration sensor 18 and calculates amounts of movement $L_x$, $L_y$ and $L_z$ in the x-, y- and z-axis directions from the previous period. Thereafter, in step S4, the position of the image data 28 displayed on the display screen 21a, obtained through the camera 12, is entirely moved in the direction in which the calculated amounts of movement $L_x$, $L_y$ and $L_z$ of the worker 5 are canceled, in order to suppress the fluctuation of the image of the object displayed on the display screen 21a due to a movement or swing of the worker 5.

Figure 7:
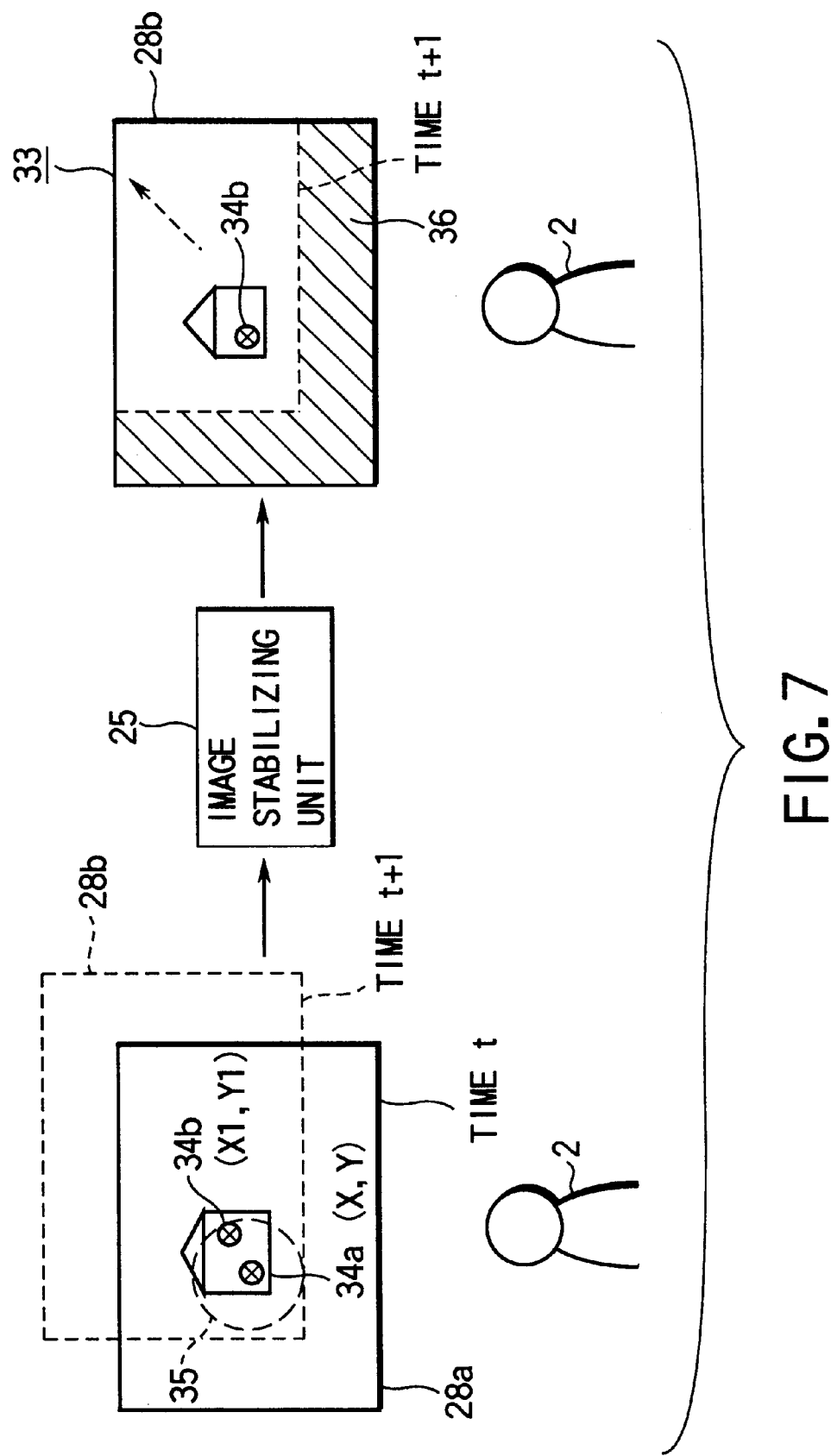
FIG. 7 is a diagram for explaining an operation of the image stabilizer.

In this case, for example, as shown in FIG. 7, a mark of the point of view of the worker is displayed at the coordinates (x, y) on the display screen.

Thus, the position of the image data 28 as a whole is corrected, so that the image of the object on the display screen may not deviate.

The image data 28 after correction is supplied to the image reproducing unit 26 as stabilized image data 33.

When the image stabilizing process described above is completed, after it is determined that a unit time has been elapsed, the flow returns to step S1 and coordinates (x, y) of the point of view in the next period is read.

If the amounts of movement ΔX and ΔY exceed the predetermined range, it is judged that the worker 5 turns the point of view to another point in the workplace.

In this case, the flow advances to step S6, in which the worker's movement calculating section 31 reads the accelerations $\alpha_x$, $\alpha_y$ and $\alpha_z$ in the three directions from the acceleration sensor 18 and calculates amounts of movement $L_x$, $L_y$ and $L_z$ in the x-, y- and z-axis directions from the previous period. Thereafter, the amounts of movement $L_x$, $L_y$ and $L_z$ are initialized to [0] and further the amounts of movement ΔX and ΔY are set to [0] without calculating the amounts of movement ΔX and ΔY (step S7). Correction of the position of the image data 28 as a whole to be displayed on the display screen 21a is not executed.

Thus, if the point of view of the worker 5 in the workplace 4 is moved greatly in one period (unit time), the fluctuation suppressing process using the amounts of movement based on data obtained by the acceleration sensor 18 is not executed.

When the image stabilizing process described above is completed, after it is determined that a unit time has been elapsed (step S5), the flow returns to step S1 and coordinates (x, y) of the point of view in the next period is read.

An example of the operation executed by the image stabilizing unit 25 will be described with reference to FIG. 7.

It is assumed that image data 28a obtained by the camera 12 at time t (indicated by the solid line) is changed to image data 28b at time t+1 after lapse of a period (indicated by the dot line) due to vibration or movement of the head 5a.

Further, it is assumed that a point of view 43a of the worker 5 at the time t is moved to a point of view 43b in an upper right portion of the image at the time t+1. However, since the amount of movement is within a predetermined range 35 (indicated by the circle) in the period (unit time), it is considered that the point of view is substantially unchanged.

In this case, the image data 28b on the screen at the time t+1 is moved entirely toward an upper right portion as indicated by the dotted arrow, so that the position of the image of the point of view 43a at the time t+1 can coincide with that of the point of view at the time t. According to the movement, a non-display region 36 as indicated by slant lines is generated.

As a result, the point of view of the worker 5 does not move in the display screen 21a of the CRT display device 21. Therefore, the manager 2 can observe a stable image.

At this time, if a CCD camera having a wide angle of field is used as the camera 12, and part of image taken by the camera is displayed in the display screen 21a of the CRT display device 22, a non-display region 36 cannot be formed in the stabilized image data 33.

A structure and operation of the designated position calculating unit 27 shown in FIG. 4 will now be described.

Figure 8:
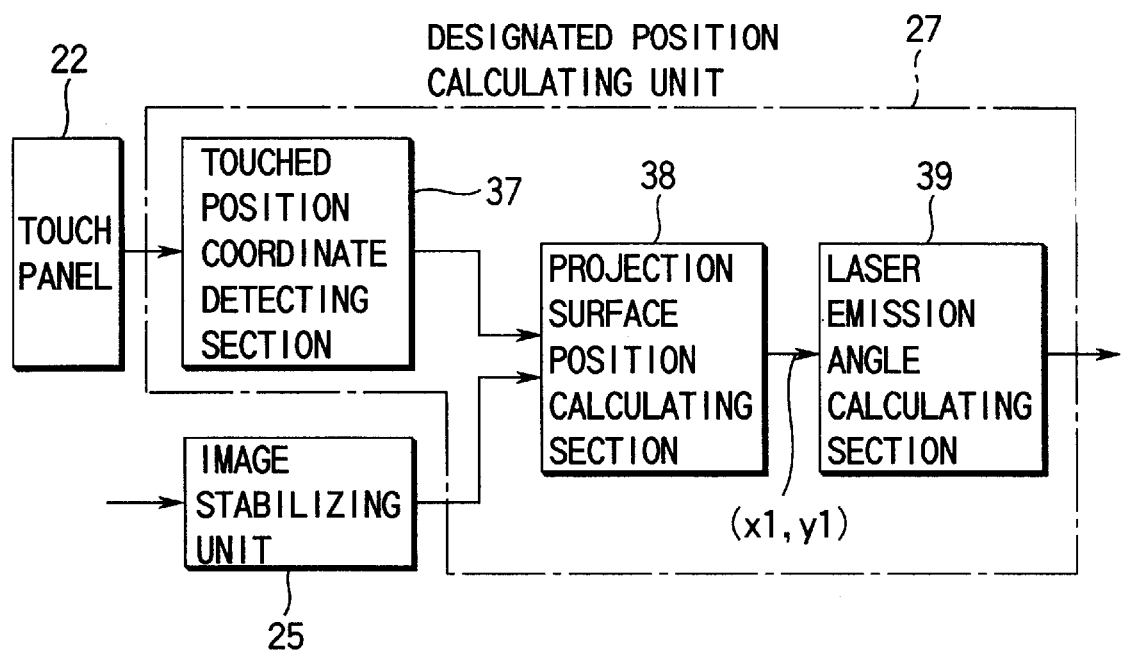
FIG. 8 is a detailed block diagram showing a structure of a designated position calculating unit incorporated in the image telecommunication system.

As shown in FIG. 8, the designated position calculating unit 27 comprises a touched position coordinate detecting section 37, a projection surface position calculating section 38 and a laser emission angle calculating section 39.

When an object corresponding to the image data stabilized in the image stabilizing unit 25 is displayed on the display screen 21a of the CRT display device 21, if the manager 2 depresses a position of the touch panel 22 to inform the worker of the position, the touched position coordinate detecting section 37 detects the touched position on the touch panel 22 and transmits the detected position to the. projection surface position calculating section 38.

Figure 9:
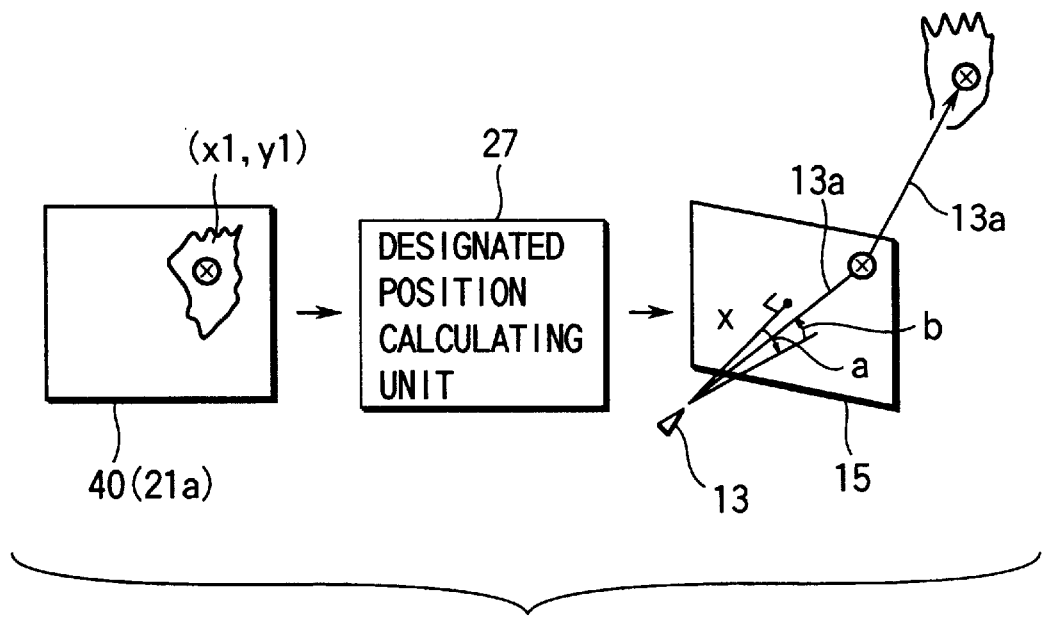
FIG. 9 is a diagram for explaining an operation of the designated position calculating unit.

The projection surface position calculating section 38 calculates designated coordinates ($x_1$, $y_1$) on an image screen 40 shown in FIG. 9 (the display screen 21a of the CRT display device 21), i.e., stabilized image data input from the image stabilizing unit 25. The designated coordinates thus calculated are transmitted to the laser emission angle calculating section 39.

The laser emission angle calculating section 39 constitutes in a virtual space a camera model having a focal distance f equivalent to the focal distance f of the camera 12. It calculates three-dimensional emission angles a and b formed between the upper semi-transparent mirror 15 shown in FIG. 9 and the laser beam 13a emitted from the laser source 13 mounted on the helmet 7 of the worker 5.

Therefore, when an object including the point of view of the worker, which is present in the field of view of the worker 5, is stably displayed on the display screen 21a of the CRT display device 21 of the manager's device 3 in the managing room 1, if the manager 2 designates through the touch panel 22 a point which he/she instructs the worker 5 in the workplace 4 to look at and gives instructions through the microphone 24, the laser beam 13a is irradiated on the corresponding position designated by the manager on the actual object in the workplace 4. Thus, the manager 2 can accurately indicate the position to the worker 5 in the workplace 4.

With the image telecommunication system as described above, the manager 2 in the managing room 1 and the worker 5 in the remote workplace 4 can promptly exchange information with reality.

The system of this embodiment can be applied to guard, patrol, factory maintenance, an emergency measure, etc.

Further, with the system of this embodiment, the manager 2 can simultaneously observe a plurality of workers 5 in different workplaces 4. In this case, skillful managers need not go patrolling to the workplaces along with workers, resulting in personnel reduction.

Figure 10:
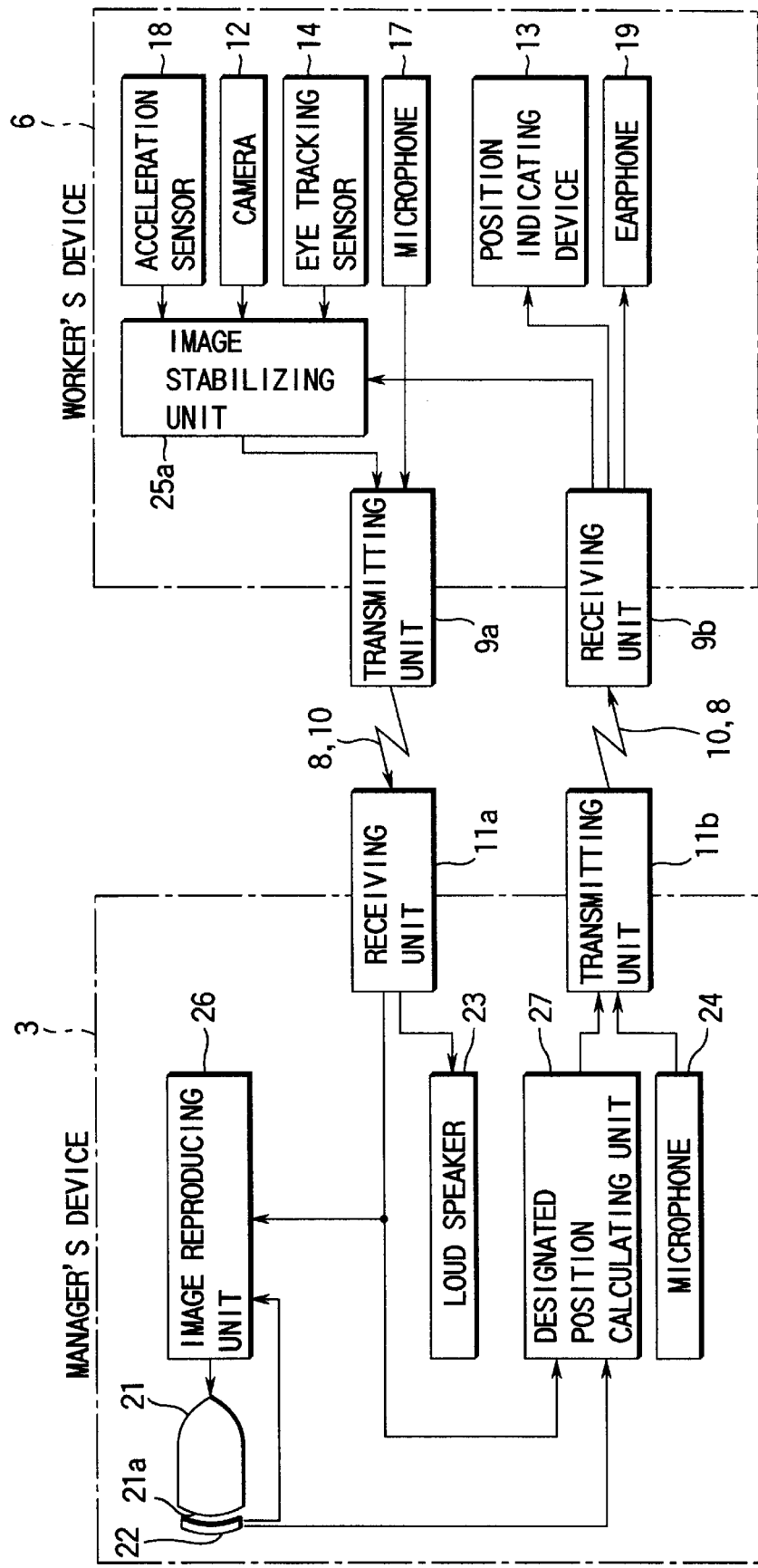
FIG. 10 is a block diagram showing an image telecommunication system according to another embodiment of the present invention.

FIG. 10 is a block diagram schematically showing an image telecommunication system according to another embodiment of the present invention. The same portions as those in the image telecommunication system shown in FIG. 4 are identified by the same reference numerals as those used in FIG. 4, and descriptions thereof are omitted.

In the image telecommunication system of this embodiment, a worker's device 6 incorporates an image stabilizing unit 25a to stably display image data 28 obtained by a camera 12 of the worker's device 6 on a display screen 21a of a CRT display device.

Figure 11:
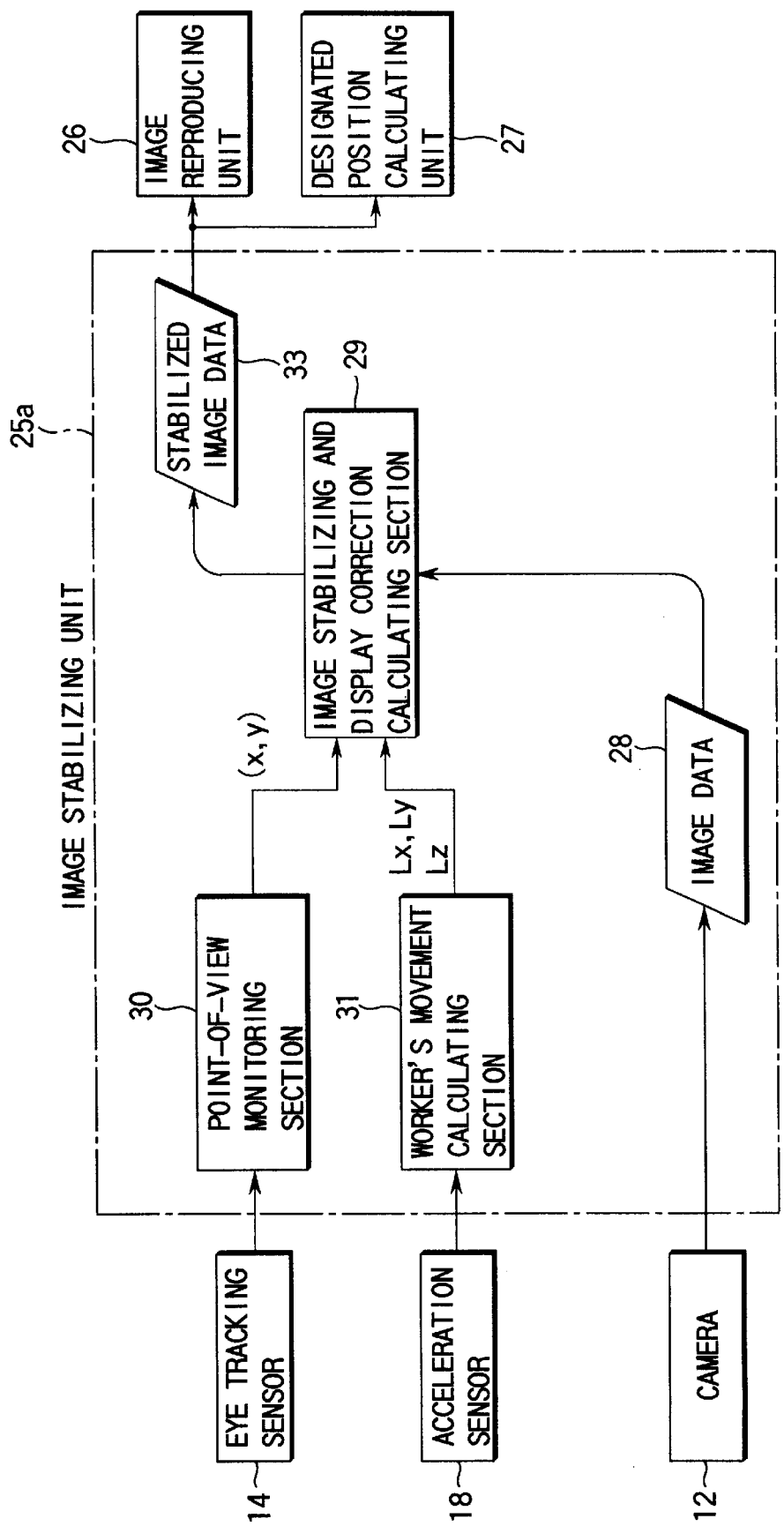
FIG. 11 is a block diagram showing a detailed structure of an image stabilizing unit incorporated in the image telecommunication system shown in FIG. 10.

FIG. 11 shows a detailed structure of the image stabilizing unit 25a incorporated in the worker's device 6. The image stabilizing unit 25a does not have a lock mode setting section.

The image, acceleration and point of view obtained by the camera 12, an acceleration sensor 18 and an eye tracking sensor 14 in the worker's device 6 are input to the image stabilizing unit 25a. The image stabilizing unit 25 stabilizes image data 28 supplied from the camera 12, using the acceleration and point of view and generates stabilized image 33. The stabilized image 33 is transmitted to the manager's device 3 via a transmitting unit 9a.

An image reproducing unit 26 of the manager's device 3 receives the stabilized image 33 from the worker's device 6 and displays it on the display screen 21a of the CRT display device 21.

In the system of this embodiment, if it is necessary for the manager 2 to stop an animation image on the display screen 21a of the CRT display device 21 to observe it in detail, an image stop command is directly transmitted to the image reproducing unit 26 by depressing a stop button displayed on a touch panel 22.

The present invention is not limited to the above embodiments.

For example, in the above systems, a laser source is used as the position indicating device 13 for indicating an object the position designated by the manager 2. However, the position indicating device 13 may project the designated position on the eyeglasses of the worker's device 6. In this case, since the worker 5 looks at the object through the eyeglasses on which the designated position is indicated, he/she can accurately recognize the point designated by the manager 2.

Further, since the camera 12 is mounted on the helmet 7 of the worker 5, when the worker 5 inclines the head 5a, the image displayed on the display screen 21a of the manager's device 3 is also inclined. To prevent this, the inclination angle of the camera 12 is calculated from the acceleration angles $\alpha_x$, $\alpha_y$ and $\alpha_z$ in the three-dimensional directions detected by the acceleration sensor 18, thereby correcting the inclination of the image displayed on the display screen 21a.

As described above, the image telecommunication system of the present invention detects the point of view and movement of the worker 5, and stably displays to the manager 2 the situations observed by the worker 5 in the remote workplace 4.

In addition, since the portion designated by the manager 2 as the point to be checked is indicated to the worker 5, the instructions can be transmitted to the worker 5 more accurately along with the voice.

Thus, information on the situations in the workplace 4 can be supplied to the manager with reality, while instructions can be transmitted from the manager to the workplace accurately. As a result, the load of the worker 5 in the workplace can be lightened. In particular, the present invention is effectively utilized in case of emergency.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. An image telecommunication system comprising:
a worker's device, put on a worker's person, and configured to collect an image of an object present in a field of view of the worker and to transmit the image outside the worker's device, wherein the worker's device includes:
a detector configured to detect a point of view of the worker at fixed periods, and
a movement detector configured to detect amounts of movement of the worker at the fixed periods; and
a manager's device, placed in a remote place distant from the worker's device, and configured to receive and display the image of the object transmitted from the worker's device on a display screen, wherein the manager's device includes:
a fluctuation suppressor configured to suppress fluctuation of the image displayed on the display screen, when it is determined that the worker looks at the object substantially continuously, and
a circuit, when a difference between a point of view detected in a current period and a point of view detected in a previous period is within a predetermined range, configured to determine that the worker looks at the object substantially continuously, and to move the image of the object displayed on the display screen in a direction in which the difference is canceled.

2. An image telecommunication system comprising:
a worker's device, put on a worker's person, and configured to collect an image of an object present in a field of view of the worker and to transmit the image outside the worker's device, wherein the worker's device includes:
a first detector configured to detect a point of view of the worker at fixed periods,
a second detector configured to detect amounts of movement of the worker at fixed periods, and
an indicator configured to visually indicate a position on the object corresponding to a designated position received from a manager's device;
the manager's device, placed in a remote place distant from the worker's device and configured to receive and display the image of the object transmitted from the worker's device on a display screen, wherein the manager's device includes:
a transmitter configured to transmit a designated position, designated in a state where the image is displayed on the display screen, to the worker's device; and
a fluctuation suppressor configured to suppress fluctuation of the image displayed on the display screen, when it is determined that the worker looks at the object substantially continously:
a circuit, when a difference between a point of view detected in a current period and a point of view detected in a previous period is within a predetermined range, configured to determine that the worker looks at the object substantially continuously, and to move the image of the object displayed on the display screen in a direction in which the difference is canceled.

3. The image telecommunication system according to claim 2, wherein the indicator irradiates a laser beam onto the position on the object.

4. An image telecommunication system comprising:
a worker's device, put on a worker's person, and configured to collect an image of an object present in a field of view of the worker and to transmit the image outside the worker's device; and
a manager's device, placed in a remote place distant from the worker's device and configured to receive and display the image of the object transmitted from the worker's device on a display screen, wherein:
the manager's device includes a transmitter configured to transmit a designated position, designated in a state where the image is displayed on the display screen, to the worker's device; and
the worker's device includes an indicator configured to visually indicate a position on the object corresponding to the designated position received from the manager's device and the indicator projects the position on the object onto eyeglasses put on the worker.

5. The image telecommunication system according to claim 2, wherein the indicator projects the position on the object onto eyeglasses put on the worker.

6. The image telecommunication system according to claim 2, wherein the image of the object present in the field of view of the worker is collected by a camera mounted on a front portion of a helmet put on the worker's head.

7. The image telecommunication system according to claim 6, wherein the movement detector comprises an acceleration sensor mounted on the helmet and an integrator configured to integrate twice an acceleration detected by the acceleration sensor.

8. The image telecommunication system according to claim 6, wherein the movement detector is a gyroscope mounted on the helmet.

9. The image telecommunication system according to claim 6, wherein the detector is an eye tracking sensor, mounted on a front portion of the helmet, for detecting a position of a pupil of the worker.

10. The image telecommunication system according to claim 7, wherein the manager's device further includes a calculator configured to calculate an inclination angle of the camera from the acceleration detected by the acceleration sensor and a corrector configured to correct an inclination of the image displayed on the display screen using the calculated inclination angle.

11. The image telecommunication system according to claim 2, wherein the manager's device further includes a lock mode setter configured to temporarily stop movement of the image displayed on the display screen, when a lock operation is performed in a state where the image is displayed.

12. The image telecommunication system according to claim 2, wherein the designated position is designated in the manager's device through a touch panel provided in front of the display screen.

* * * * *

UNITED STATES PATENT AND TRADEMARK OFFICE
CERTIFICATE OF CORRECTION

PATENT NO. : 6,342,915 B1
DATED : January 29, 2002
INVENTOR(S) : Nobuyuki Ozaki et al.

It is certified that error appears in the above-identified patent and that said Letters Patent is hereby corrected as shown below:

Column 10,
Line 33, "continuously:" should read -- continuously; --.

Signed and Sealed this

Twenty-first Day of May, 2002

Attest:

Attesting Officer

JAMES E. ROGAN
Director of the United States Patent and Trademark Office